Figure 3:
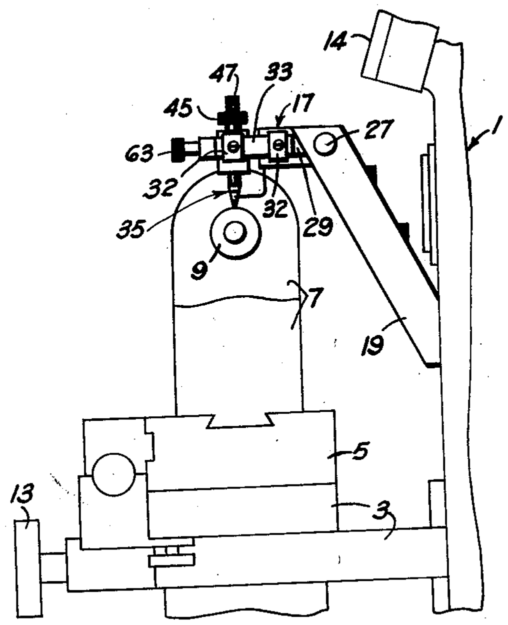

THREAD LEAD CHECKING ATTACHMENT FOR OPTICAL COMPARATORS

Filed June 3, 1954

INVENTORS
KIRK E. BIRRELL
CYRIL B. KEANE
BY W. E. Thibodeau, A. W. Dew
and H. I. Forman ATTORNEYS:

INVENTORS
KIRK E. BIRRELL
CYRIL B. KEANE
BY
W. E. Thibodeau, A. W. Dew
and H. I. Forman ATTORNEYS:

United States Patent Office 2,794,262

Patented June 4, 1957

2,794,262

THREAD LEAD CHECKING ATTACHMENT FOR OPTICAL COMPARATORS

Kirk E. Birrell, Welland, Ontario, Canada, and Cyril B. Keane, Huntingdon Valley, Pa., assignors to the United States of America as represented by the Secretary of the Army Application June 3, 1954, Serial No. 434,351

13 Claims. (Cl. 33—199)

(Granted under Title 35, U. S. Code (1952), sec. 266)

The invention described herein may be manufactured and used by or for the Government for governmental purposes without the payment of any royalty thereon.

This invention relates to testing machines and more particularly to apparatus which may be used in conjunction with an optical comparator to determine the accuracy of the lead of external screw threads.

The accuracy of any testing machine is, of course, limited by the errors introduced by the mechanism employed by such machines. For example, presently available apparatus which incorporate sliding and threaded parts in the measurment mechanism introduce errors due to friction and backlash, respectively. As a result, it is difficult to obtain accurate measurement of the lead of external screw threads with such equipment.

It is, therefore, an object of this invention to provide precision lead checking apparatus for use in conjunction with a conventional optical comparator, which will eliminate the aforementioned sources of difficulty.

Another object of this inventon is to provide lead error detection apparatus which embodies a reduced number of movable components.

A further object of this invention is to provide lead error detection apparatus for testing the lead of screw threads which will mechanically amplify and transmit the error so amplified to an optical comparator for further optical amplification.

In furtherance of these objects, a device is provided which utilizes an adjustable table with associated work centers and precision optical amplification system of a conventional optical comparator to check the lead error of external threads of all sizes. This device incorporates a retractable stylus that contacts the pitch diameter of the thread to detect and then transmit the lead error to a mechanical amplification system. This amplification system, in response to the detected error, causes exaggerated movement of an indicator which has been placed in the focal plane of the optical system of the comparator. The movement of the indicator is also optically amplified and is visually detectable upon the screen of the comparator, such that an extremely accurate measurement of the lead error of the specimen is made.

Figure 1:
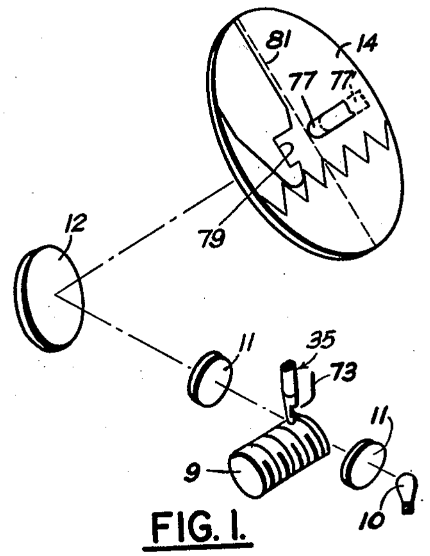
Figures 2, 4:
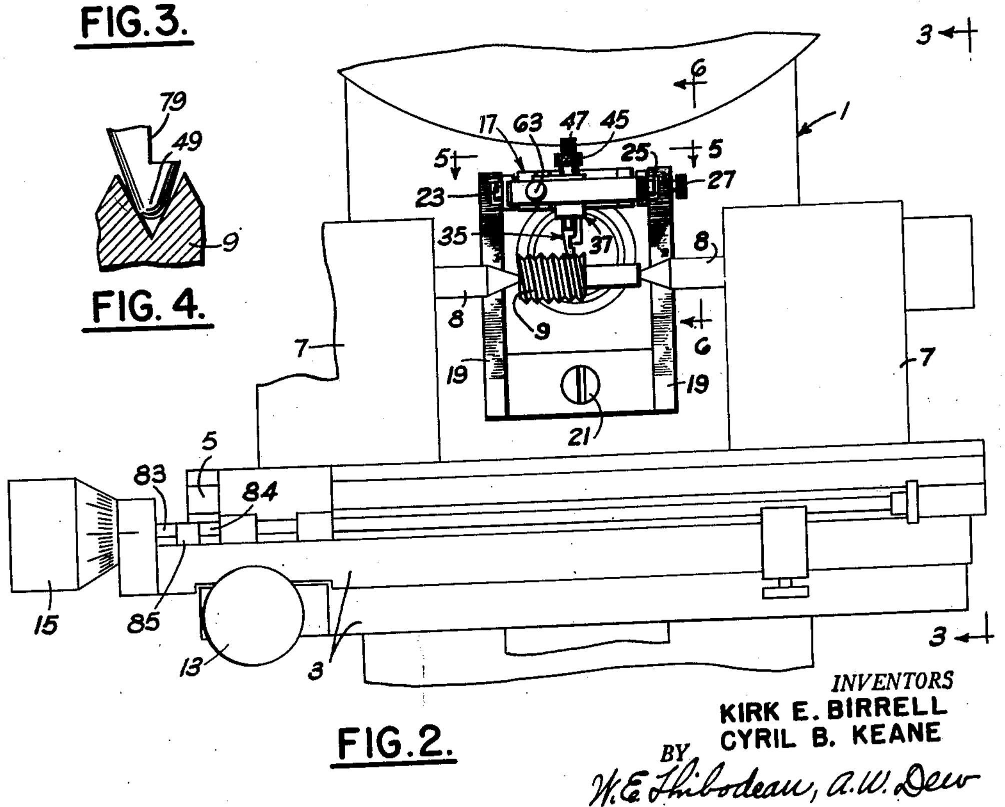
Figure 5:
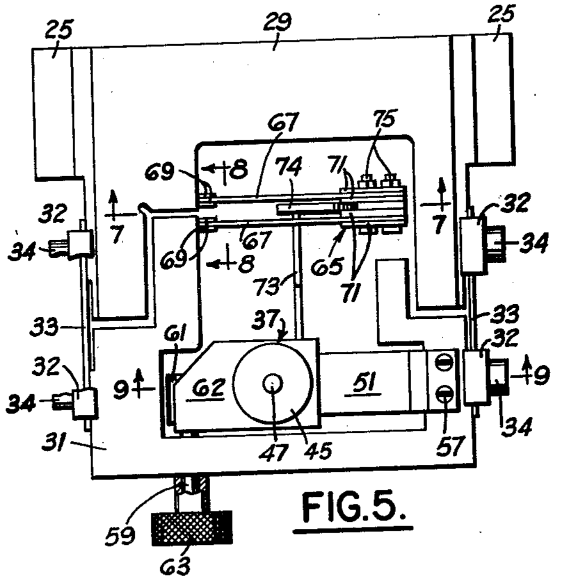
Figure 5A:
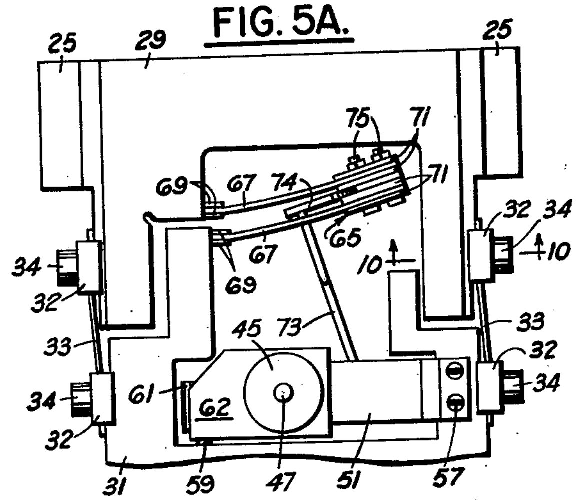
Figure 7:
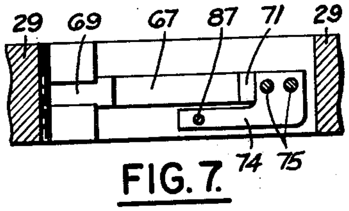
Figure 10:
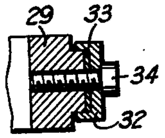
Figure 8:
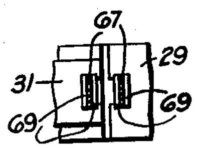
Figure 9:
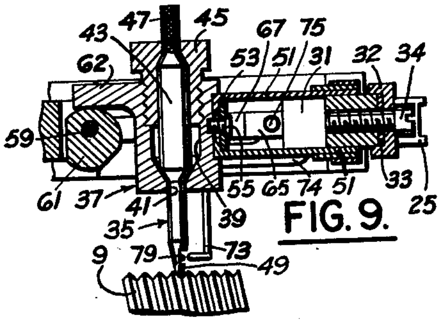
Figure 9A:
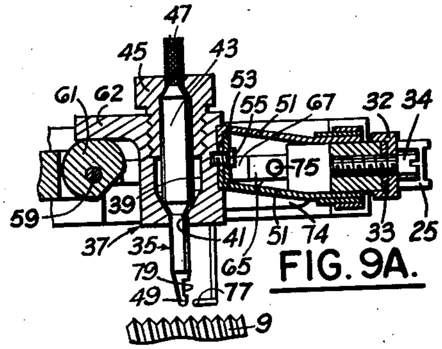
Figure 6:
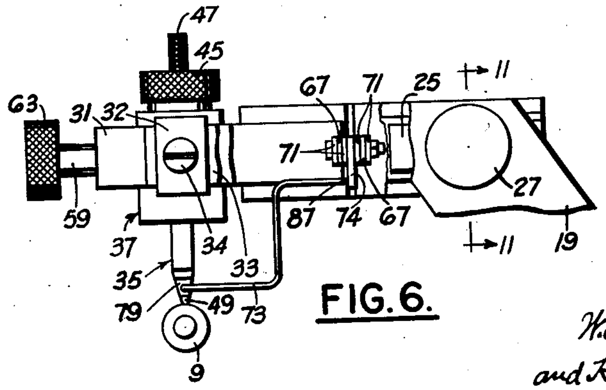
Figure 11:
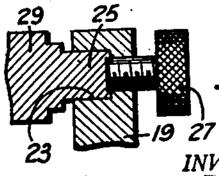

All of the foregoing, as well as other objects and advantages of this invention, will become apparent from a study of the following description taken in conjunction with the accompanying drawings, wherein like characters of reference indicate corresponding parts throughout the several views and wherein:

Figure 1 is a schematic view, in perspective, of a stylus and indicator in association with a screw thread, as viewed upon the screen of an optical comparator, the indicator being shown in full and dotted lines to illustrate a change in position thereof, Figure 2 is a front elevational view of the apparatus provided in accordance with this invention, shown in conjunction with an optical comparator in phantom lines and with portions thereof broken away, Figure 3 is a side elevational view, taken along line 3—3 of Figure 2, with portions thereof being partially broken away, Figure 4 is an enlarged view, partly in section, showing the engagement of the stylus with the threads of a threaded member, Figure 5 is an enlarged top elevational view of the lead checking apparatus, taken along line 5—5 of Figure 2, Figure 5A is a view similar to Figure 5, showing the position which the components of the apparatus assume in response to the detection of an error in the lead of a thread, Figure 6 is an enlarged side elevational view of the apparatus shown in Figure 2 and taken along line 6—6 thereof, and with parts thereof broken away, Figure 7 is a sectional view, taken along line 7—7 of Figure 5, showing the connection of the indicator to the lead checking apparatus, Figure 8 is a sectional view, similar to Figure 7, taken along line 8—8 of Figure 5, Figure 9 is an enlarged sectional view, taken along line 9—9 of Figure 5, showing the stylus actuating mechanism in lowered or error detecting engagement with the threaded member, Figure 9A is a view similar to Figure 9, showing the stylus in raised or disengaged position relative to the threaded member, Figure 10 is a sectional view, taken along line 10—10 of Figure 5A, showing the connection of the movable stylus supporting part of the apparatus to the fixed portion thereof, and Figure 11 is a sectional view, taken along line 11—11 of Figure 6, showing the manner in which the instant apparatus is connected to the associated optical comparator.

Referring now to the drawing, particularly Figures 2 and 3 thereof, an optical comparator of conventional construction, generally designated by the reference numeral 1, is shown in conjunction with apparatus provided in accordance with this invention.

Generally, the comparator 1 includes a fixed base 3 on which a table 5 is supported for selective, longitudinal, horizontal, movement. Disposed in an adjustable position on the table are a pair of center posts 7, 7, each of which includes an adjustable work positioning center 8 for supporting an externally threaded member 9 therebetween for inspection or test purposes. The table, center posts and work centers are adjusted so that the upper profile of the threaded member is brought into alignment with a light source 10, objective lenses 11 and mirror 12 of the comparator, whereby the image thereof is brought into focus upon the comparator screen 14.

The lead error detection and mechanical amplification apparatus, generally designated by the reference numeral 17, is supported so as to directly overlie the test member 9. The support for this apparatus comprises a bracket 19 which is removably attached to the comparator by any suitable means, such as a machine screw 21. As shown in Figure 11, the upper extensions of the arms of the bracket 19 are each provided with a horizontal groove 23 in which outwardly extending flanges 25 of the lead checking apparatus are slidably accommodated. A set screw 27 associated with each such groove 23 locks the apparatus in a proper adjusted position relative to the test specimen.

Referring to Figures 5 and 5A, the lead checking apparatus is shown to comprise a fixed frame 29 and a relatively movable frame 31. The movable frame is supported on the fixed frame for limited horizontal movement by a pair of resilient arms 33, 33 which flexibly interconnect the two frames. As clearly shown with further reference to Figure 10, a guide plate 32 overlies each end of both arms 33, 33 and cooperates with machine screws 34 to securely hold the parts in assembled relationship. In the normal or relaxed position of the spring arms 33, 33 as shown in Figure 5, the movable frame is centered relative to the fixed frame.

A stylus 35, which is held in a stylus holder 37, is operatively supported on the movable frame 31 of the apparatus. To accommodate the stylus, the holder has a vertical bore 39 which tapers into a smaller bore 41 at the lower end thereof. The stylus 35 extends through the smaller bore of the holder and has an enlarged shank portion 43 which is tapered at both ends. The lower tapered end of the shank is seated on the tapered surface of the enlarged bore of the holder; the upper tapered end of the shank engages a similarly tapered surface in a cap 45 which is threadedly secured to the upper portion of the holder. The tapered surface of the cap terminates in a bore which accommodates the upwardly and outwardly extending terminal portion 47 of the stylus. This particular manner of assembly affords a positive and rapid means for installing a stylus of proper size in the apparatus.

A pair of laterally extending resilient arms 51 provides a vertically adjustable support for the stylus holder. One end of each of these arms is rigidly connected to one side of the holder by a plate 53 and screw 55, as shown in Figure 9; the other end of each arm is rigidly connected to the upper and lower surfaces of the movable frame 31 by machine screws 57, as shown in Figure 5. Thus, the arms are disposed in spaced apart, parallel relation to each other. Supported in this manner, the stylus holder is immovably connected to the movable frame 31 except for limited vertical movement as permitted by the arms 51. A shaft 59, to which is keyed a cam 61, is journaled on the movable frame 31 for rotary movement. The cam 61 underlies a protruding flange 62 of the stylus holder, so that upon rotation of the shaft by means of a knob 63, attached thereto, the cam raises the stylus holder against the resistance of the resilient arms 51, 51 from its normal horizontal position, as shown in Figure 9, to its inoperative or raised position, as shown in Figure 9A. The retracting movement of the stylus and holder from a normal thread engaging position to a raised inoperative position is required to facilitate the hereinafter described operation of the apparatus.

The mechanical amplification system, generally designated by the reference numeral 65, which magnifies the lead error detected by the stylus is installed between the movable and fixed frames. The stylus, upon engagement with a thread of improper lead, will cause the movable frame to move horizontally with respect to the fixed frame. The mechanical amplifier relies upon the relative movement of the movable and fixed frames for its operation. Referring to Figure 5, the amplifier is shown to include a pair of reed-like resilient arms 67, 67 of equal length, one of which is rigidly attached to the fixed frame and the other of which is rigidly attached to the movable frame by any suitable means. One satisfactory manner of attaching these amplifier arms to the respective frames is illustrated in Figure 8, wherein one end of each arm 67 is sandwiched between two rigid plates 69, 69 and force-fitted in a groove provided in each frame. Assembled with the other outer ends of the arms, as shown in Figures 5 and 7, is an error indicator which comprises a stiff, wire-like element 73 and an attachment plate 74. Bolts 75, 75 together with a sufficient number of shims 71 maintain the parallelism of the arms 67 and provide suitable means for rigidly connecting these parts. The indicator is bent in the manner shown in Figure 6, to lower the distal extremity or tip 77 thereof to the level of a recessed flat portion 79 of the stylus. The recessed portion 79 of the stylus affords a flat vertical surface which may be used as a reference plane during operation of the apparatus.

*Operation*

The test member 9 is first supported between the work centers 8 on the table of the comparator and the table is adjusted by means of a control knob 13, to bring the profile of the threads into focus on the viewing screen 14. The error detection apparatus 17 is then attached to the bracket 19 so that it directly overlies the threaded member, whereby the stylus 35 engages the facing surfaces of two adjacent threads, in the manner shown in Figure 4. Since it is desirable to have the tip 49 of the stylus engage the facing sides of two adjacent threads in the region of their pitch diameter, in order to preclude any lost motion or backlash and to assure greater accuracy, it is important that a stylus of proper size be used for each particular group of thread sizes. Care should be exercised to obtain proper engagement of the stylus without moving the movable frame 31 out of its center or normal position, for reasons which will become apparent in the course of this description. With the parts all in their proper relationship, the viewing screen 14 will produce an image similar to that shown in full lines in Figure 1, such that the image of the tip 77 of the indicator will be aligned with a center line 81 on the screen. For the purpose of determining the lead error, a precision micrometer 15 is provided, which is supported on the base 3 of the comparator. The spindle 83 of the micrometer 15 is moved into abutment with a stop 84 on the end of the table at which time an initial reading is taken of the micrometer to determine the initial position of the table.

The stylus holder and the stylus are then raised vertically, by actuation of the cam 61, whereby the tip of the stylus disengages the thread, as shown in Figure 9A, to permit longitudinal movement of the table and threaded member from the initial or indexing position. The table, to which the threaded member is secured, is then moved sufficiently by actuation of the control knob 13 to permit a gage block 85, of a dimension corresponding to the theoretical or calculated distance between a determined number of threads on the member being tested, to be placed between and in contact with spindle 83 of the micrometer and the stop 84, in the manner illustrated in Figure 2. The stylus is then lowered into engagement with the threaded member which has thus been moved to its measuring position. It will be recognized that, in the absence of any error in the lead of the thread, the stylus would engage the thread in the appropriate manner without restraint since the member has been displaced an exact number of thread-widths as determined by the dimension of the gage-block. More likely than not, however, an error in the lead of the thread will not permit the stylus to engage the thread in the appropriate manner without urging the movable frame out of its first or normal position to a second, error detecting position, against the action of the resilient arms 33, 33, as shown in Figure 5A. This movement of the frame, which corresponds to the lead error of the thread, is detected by the mechanical amplifier system. Inasmuch as one of the reed-like spring arms 67, 67 is held fixed by the fixed frame 29 and the other such arm is displaced by the movement of the movable frame 31, the parallelism of the unit is distorted and the outer, connected, ends of the arms are caused to move in an arcuate path. Because of the length of the arms, the physical displacement of the outer, connected, ends thereof is greater than the relative movement of the frames which originally caused the distortion of the arms. The arcuate displacement of the outer ends of the arms is amplified by the error indicator arm 73 since its attachment plate 74 is common to and moves with the displaced outer ends of the arms. The indicator arm and attachment plate resemble a bell-crank which pivots, in lever fashion, about a point near the connection 87 of the two elements. Inasmuch as the indicator arm is of much greater length than the attachment plate, it will be apparent that the movement of the tip 77 of the indicator will exceed the movement of the outer ends of the arms 67, 67. This amplification of the originally detected error, as was represented by the displacement of the movable frame relative to the fixed frame, facilitates the accurate measurement of very slight irregularities.

These lead errors are still further amplified through the optical system of the associated comparator. Referring to Figure 1, the image of the tip 77 of the indicator arm 73 is shown in dotted lines, designated by 77', displaced from its original full line position. The change in position is, of course, representative of the error in the lead of the thread. If calibrated graduations were provided on the screen, it would be possible to make direct measurements of the lead error therefrom. However, the precision micrometer which is associated with the table of the comparator provides a very accurate measurement device.

By actuating the control knob 13, and accordingly adjusting the micrometer 15, the table of the comparator together with the workpiece is moved relative to the fixed frame 29 of the detection apparatus. In moving the table to the left, as viewed in Figure 5A, the stylus 35 can be made to assume its original position such that the tip 77 of the indicator will again align itself with the center line of the comparator screen. By then comparing the originally observed setting of the micrometer to this finally observed setting, the error in the lead of the measured number of threads may be readily calculated.

It will become obvious to those skilled in the art that many other and different arrangements may be used within the purview of this invention. Of course, any of the various types of conventional optical comparators may be used in conjunction with the detection apparatus described. In this respect, less accurate, but satisfactory, results could be obtained by directly calibrating the movement of the error indicator, thereby making it possible to use the apparatus in the absence of a suitable optical comparator. Thus, it is to be understood that the form of the invention herewith shown and described is to be taken as the preferred example of the same and that changes in the shape, size and arrangement of the parts may be resorted to without departing from the spirit of the invention. We, furthermore, do not wish to be limited beyond the limitations which may be imposed by the following claims.

We claim:

1. In a lead testing apparatus for an externally threaded work piece having means for supporting the work piece for detection and measurement of errors in thread lead, the improvement which comprises measuring means associated with the apparatus for determining the extent of error in the thread lead, said measuring means including a first member supported against movement relative to the work support means, a second member, resilient means supporting said second member from said first member for movement in a plane containing the thread axis, said resilient means being so constructed and arranged as to maintain said second member normally in a thread engaging position and parallel to the thread axis during movement thereof from said normal thread engaging position, thread engaging means carried by said second member, indicator means associated with said thread engaging means for determining the extent of movement of said thread engaging means from a normal thread engaging position, and means carried by said second member operatively engaged with said thread engaging means for effecting engagement and disengagement thereof with the work piece thread.

2. The invention as defined in claim 1 wherein said thread engaging means comprises a member constructed and arranged to engage the work piece threaded portion at points of tangency between two adjacent threads.

3. The invention as defined in claim 1 and wherein said indicator means is connected between said first member and said second member in a manner to mechanically amplify the extent of movement of said thread engaging means away from the normal thread engaging position thereof.

4. The invention as defined in claim 1 and wherein said measuring means includes an optical comparator in association with said indicator means and said thread engaging means, said thread engaging means and said indicator means being disposed in the focal plane of said comparator to effect further amplification optically of any movement of said thread engaging means from its normal thread engaging position.

5. The invention as defined in claim 1 wherein said thread engaging means comprises a stylus, said measuring means including a pair of resilient arms, one end of each one of said pair of arms being fixed to said first and second members, respectively, the other end of each one of said pair of arms being fixed to said stylus, said arms being resilient in a plane normal to the thread axis.

6. The invention as defined in claim 1 wherein said indicating means comprises a pair of arms resilient in a plane containing the thread axis, and an indicator, an end of one of said pair of arms being fixed to said first member, an end of the other one of said pair of arms being fixed to said second member, said arms being substantially equal in length and arranged in juxtaposed spaced apart relation, the other ends of said arms being rigidly connected together, said indicator having one end thereof rigidly connected to the junction of said arms, the distal extremity of said indicator being freely disposed and terminating adjacent to said thread engaging means.

7. The invention as defined in claim 6 wherein said measuring means includes an optical system for creating an enlarged view of the extent of error in the thread lead, said distal extremity and said thread engaging means being disposed in the focal plane of said optical system.

8. The invention as defined in claim 1 wherein said indicator means comprises a pair of parallel, spaced apart resilient arms disposed in a plane parallel to the plane in which movement of said second member is effected, and an indicator, an end of one of said pair of arms being fixed to said first member, an end of the other one of said pair of arms being fixed to said second member, the other ends of said arms being connected together, said indicator having one end thereof fixed to the junction of said arms, the distal extremity of said indicator being freely disposed and terminating adjacent to said thread engaging means, whereby movement of said second member relative to said first member is operative to cause arcuate movement of the joined together arm ends and cause movement of said indicator relative to said thread engaging means to indicate the extent of movement thereof in checking thread lead error.

9. The invention as defined in claim 1 wherein said thread engaging means is carried by said second member by a pair of parallel spaced apart arms, said arms being resilient in a single plane normal to the plane in which movement is imparted to said second member, an end of each one of said pair of arms being rigidly connected to said second member, the other end of each one of said pair of arms being rigidly connected to said thread engaging means.

10. In precision testing apparatus having means for supporting an externally threaded member for detection and measurement of errors in thread lead, measuring means comprising a first member supported against movement relative to the member support means, a second member, resilient means supporting said second member from said first member for movement in a plane containing the thread axis, said resilient means being so constructed and arranged as to maintain said second member normally in a thread engaging position and parallel to the thread axis during movement thereof apart from said normal thread engaging position, thread engaging means, a pair of parallel spaced apart arms, said arms being resilient in a single plane normal to the plane in which movement is imparted to said second member, an end of each one of said pair of arms being rigidly connected to said second member, the other end of each one of said pair of arms being rigidly connected to said thread engaging means, operating means on said second member in operative engagement with said thread engaging means for effecting engagement and disengagement thereof with the thread of said member, and indicator means connected between said first member and said second member in a manner to mechanically amplify the extent of movement of said thread engaging means apart from the normal thread engaging position thereof.

11. The invention as defined in claim 10 wherein said indicator means comprises a pair of arms resilient in a plane containing the thread axis and an indicator, an end of one of said pair of arms being fixed to said first member, an end of the other one of said pair of arms being fixed to said second member, said arms being substantially equal in length and arranged in juxtaposed spaced apart relation, the other ends of said arms being rigidly connected together, said indicator having one end thereof rigidly connected to the junction of said arms, the distal extremity of said indicator being freely disposed and terminating in close proximity to said thread engaging means.

12. The invention as defined in claim 11 wherein said thread engaging means comprises a member constructed and arranged to engage the threaded portion of the member at points of tangency between two adjacent threads.

13. The invention as defined in claim 12 and wherein said measuring means includes an optical comparator in association with said indicator and said thread engaging member, said thread engaging member and said indicator being disposed in the focal plane of said comparator to effect further amplification optically of any error detected by said thread engaging means in the thread lead of the member being tested.

References Cited in the file of this patent

UNITED STATES PATENTS

| | | |
|---|---|---|
| 1,297,194 | Lindgren | Mar. 11, 1919 |
| 1,353,608 | Parker | Sept. 21, 1920 |
| 1,528,314 | Wickman | Mar. 3, 1925 |
| 1,894,025 | Dennison et al. | Jan. 10, 1933 |
| 1,956,812 | Smith | May 1, 1934 |
| 2,016,420 | Engst | Oct. 8, 1935 |
| 2,066,999 | Neufeld | Jan. 5, 1937 |
| 2,321,903 | Fox | June 15, 1943 |